(12) United States Patent
Shah et al.

(10) Patent No.: US 8,301,994 B1
(45) Date of Patent: Oct. 30, 2012

(54) SYNCHRONIZING MULTIPLE HIERARCHAL DATA STRUCTURES

(75) Inventors: Abhishek Shah, Delhi (IN); Anuj Dhawan, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 883 days.

(21) Appl. No.: 12/209,871

(22) Filed: Sep. 12, 2008

(51) Int. Cl.
G06F 17/00 (2006.01)
(52) U.S. Cl. .................. 715/229; 715/230; 715/716
(58) Field of Classification Search .................. 707/640, 707/655–657, 829, 690–696, 802, 808, 809, 707/758, 769, 792, 797, 795; 715/209, 764, 715/853, 854
See application file for complete search history.

(56) References Cited

U.S. PATENT DOCUMENTS

| | | | | |
|---|---|---|---|---|
| 5,295,261 A * | 3/1994 | Simonetti | ................ | 1/1 |
| 6,279,007 B1 * | 8/2001 | Uppala | ................ | 1/1 |
| 6,324,555 B1 * | 11/2001 | Sites | ................ | 715/234 |
| 6,363,387 B1 * | 3/2002 | Ponnekanti et al. | ................ | 1/1 |
| 6,502,102 B1 * | 12/2002 | Haswell et al. | ................ | 1/1 |
| 6,516,337 B1 * | 2/2003 | Tripp et al. | ................ | 709/202 |
| 6,549,916 B1 * | 4/2003 | Sedlar | ................ | 1/1 |
| 6,553,364 B1 * | 4/2003 | Wu | ................ | 1/1 |
| 6,687,698 B1 * | 2/2004 | Nixon et al. | ................ | 1/1 |
| 6,772,165 B2 * | 8/2004 | O'Carroll | ................ | 1/1 |
| 6,848,078 B1 * | 1/2005 | Birsan et al. | ................ | 715/206 |
| 7,007,083 B1 * | 2/2006 | Chesley | ................ | 709/224 |
| 7,058,696 B1 * | 6/2006 | Phillips et al. | ................ | 709/217 |
| 7,181,438 B1 * | 2/2007 | Szabo | ................ | 1/1 |
| 7,209,949 B2 * | 4/2007 | Mousseau et al. | ................ | 709/206 |
| 7,269,664 B2 * | 9/2007 | Hütsch et al. | ................ | 709/246 |
| 7,333,998 B2 * | 2/2008 | Heckerman et al. | ................ | 1/1 |
| 7,752,296 B2 * | 7/2010 | Kim | ................ | 709/223 |
| 7,769,727 B2 * | 8/2010 | Sivapragasam et al. | ................ | 707/690 |
| 7,801,896 B2 * | 9/2010 | Szabo | ................ | 707/739 |
| 7,966,291 B1 * | 6/2011 | Petrovic et al. | ................ | 707/641 |
| 2002/0055932 A1 * | 5/2002 | Wheeler et al. | ................ | 707/104.1 |
| 2002/0188613 A1 * | 12/2002 | Chakraborty et al. | ................ | 707/100 |
| 2003/0093755 A1 * | 5/2003 | O'Carroll | ................ | 715/500 |
| 2003/0237047 A1 * | 12/2003 | Borson | ................ | 715/513 |
| 2004/0073560 A1 * | 4/2004 | Edwards | ................ | 707/100 |
| 2004/0230560 A1 * | 11/2004 | Elza et al. | ................ | 707/1 |
| 2006/0288056 A1 * | 12/2006 | Yamakawa et al. | ................ | 707/203 |
| 2008/0104277 A1 * | 5/2008 | Tian | ................ | 709/248 |

OTHER PUBLICATIONS

Jeff Atwood, In Praise of Beyond Compare, 2005, p. 1.*

(Continued)

*Primary Examiner* — Tuyetlien Tran
*Assistant Examiner* — Abimbola Ayeni
(74) *Attorney, Agent, or Firm* — Kilpatrick Townsend & Stockton LLP

(57) ABSTRACT

Synchronization between multiple data repositories is described which retrieves tree structures that represent the hierarchical organization of the data repositories that will be or are synchronized. One of tree structures is parsed for data nodes, while the other tree structures are parsed for each such data node to find matching data nodes having corresponding hierarchies. Moved nodes are identified when a matching node is found that does not have the same hierarchy in its tree structure. Similarly, deleted nodes are identified when a node is found with no match in a controlling tree structure. Data structure lists are compiled noting matching relationships and hierarchies and also noting moved and deleted nodes and their relationships with the rest of the formerly corresponding nodes. Using these data structure lists, a synchronization interface is generated for display to a user that visually compares the synchronization of the multiple data repositories.

21 Claims, 9 Drawing Sheets

OTHER PUBLICATIONS

BC2Help, Welcome to Beyond Compare, 2005, http://www.scootersoftware.com/BC2Help.pdf.*

Erwin et al., Oxone: A Scalable Solution for Detecting Superior Qualty Deltas on Ordered Large XML Documents, 2006, http://www.springerlink.com/content/978-3-540-47224-7/#section=491652&page=1, pp. 196-211.*

Jeff Atwood, In Praise of Beyond Compare, Nov. 29, 2005, http://www.codinghorror.com/blog/2005/11/in-praise-of-beyond-compare.html.*

Scooter Software, Welcome to Beyond Compare, Jun. 6, 2005, http://www.scootersoftware.com/BC2Help.pdf.*

* cited by examiner

| Desktop | Sync | Online |
|---|---|---|
| ▼ ☐ A ⌒ 100 | | A ⌒ 306 |
| ▼ ☐ B ⌒ 102 | 312 | B ⌒ 307 |
| ☐ M ⌒ 104 | ☐ | M ⌒ 308 |
| ☐ C ⌒ 105 | ☐ | C ⌒ 309 |
| ▼ ☐ D ⌒ 101 | 313 | ☐ D ⌒ 303 |
| ▼ ☐ E ⌒ 103 | 314 | ☐ E ⌒ 304 |
| ☐ F ⌒ 106 | ☐ | ☐ F ⌒ 305 |

FIG. 3

| Desktop | Sync | Device |
|---|---|---|
| ▼ ☐ A ⌒ 100 | | A ⌒ 502 |
| ▼ ☐ B ⌒ 102 | 501 | B ⌒ 503 |
| ☐ M ⌒ 104 | ☑ | ☐ M ⌒ 500 |
| C ⌒ 603 | | ☐ C ⌒ 605 |
| ▼ ☐ D ⌒ 101 | 607 | ☐ D ⌒ 303 |
| ☐ D>E>C ⌒ 604 | ☑ | ☐ A>B>C ⌒ 606 |

FIG. 6

| Desktop 300 | Sync 302 | Online 301 (30) |
|---|---|---|
| ▼ ☐ A | | A ⌒ 306 |
| ▼ ☐ B | 501 | B ⌒ 307 |
| ☐ M ⌒ 104 | ☑ | M ⌒ 500 |
| ☐ C ⌒ 105 | ☐ | C ⌒ 309 |
| ▼ ☐ D | | ☐ D |
| ▼ ☐ E | | ☐ E |
| ☐ F | ☐ | ☐ F |

FIG. 5A

| Desktop 300 | Sync 302 | Online 301 (30) |
|---|---|---|
| ▼ ☐ A ⌒ 100 | | ☐ A ⌒ 502 |
| ▼ ☐ B ⌒ 102 | | ☐ B ⌒ 503 |
| ☐ C ⌒ 105 | ☐ | C ⌒ 309 |
| ☐ M ⌒ 104 | ☑ | ☐ M ⌒ 520 |
| ▼ ☐ D ⌒ 101 | | ☐ D ⌒ 303 |
| ▼ ☐ E ⌒ 103 | | ☐ E ⌒ 304 |
| ☐ F ⌒ 106 | ☐ | ☐ F ⌒ 305 |

FIG. 5B

| Desktop | Sync | Network |
|---|---|---|
| ▼ ☐ A ⌐ 100 | | ☐ A ⌐ 803 |
| ▼ ☐ B ⌐ 102 | 810 | ☐ B ⌐ 804 |
| ☐ M ⌐ 105 | ☑ | ☐ M ⌐ 805 |
| C ⌐ 104 | ☐ | ☐ C ⌐ 806 |
| ▼ ☐ D ⌐ 101 | 811 | ☐ D ⌐ 807 |
| ▼ ☐ E ⌐ 103 | 812 | ☐ E ⌐ 808 |
| ☐ F ⌐ 106 | ☐ | ☐ F ⌐ 809 |

SYNCHRONIZING MULTIPLE HIERARCHAL DATA STRUCTURES

CROSS-REFERENCE TO RELATED APPLICATIONS

None

TECHNICAL FIELD

The present application relates, in general, to computerized data management and, more particularly, to synchronizing multiple hierarchical data structures.

BACKGROUND

In the information age, information management permeates most aspects of life. People at work or at school manage information, such as work documents, papers, research, emails, data, and the like. When these people leave work or school, they deal with personal information, such as letters, videos, pictures, music, and the like, or may even continue to deal with work information remotely. Many modern information management systems represent data to the user using a hierarchical data structure. The hierarchical structure allows for a logical grouping of the information into several levels of folders. This hierarchical organization generally allows the user to more easily access specific desired data within a much much larger data repository.

FIG. 1 is a diagram illustrating hierarchical data structure 10. Hierarchical data structures, such as hierarchical data structure 10, are often described as trees having various branches and leaf nodes. Because of the hierarchical nature, descriptors, such as parent, sibling, and children are used to describe the hierarchical relationship between the various files, folders, and nodes in the structure. Hierarchical structure 10 includes two main branches represented by folders A-100 and D-101. Folders A-100 and D-101 are in the top most hierarchy of hierarchical structure 10, they are siblings to each other. Within these two top level folders are folder B-102, which is a child of A-100 and E-103, which is a child of D-101. Still again, B-102 and E-103 are folders that represent a further granular breakdown of the organization of hierarchical structure 10, but still do not represent any actual data. The data in hierarchical data structure 10 is represented by files C-104 and M-105, which are children of folder B-102, and file F-106, which is a child of folder E-103. Hierarchical data structure 10 may be organized such that files C-104 and M-105 represent data of a much different nature than that of file F-106. Therefore, when reviewing hierarchical data structure 10 of the entire data repository, a user may easily bypass the entire branch of folder D-101 and proceed directly to the branch of folder A-100 to find the desired file.

Information for such repositories may be gathered and stored in various different manners and with various different devices, such as digital cameras, digital music players, a variety of computer applications, such as word processors, spread sheets, mobile phones, and the like. There may also be multiple repositories or instances of the same information. For example, music on a digital music player may exist on the player device and also on the user's computer. Photographs from a digital camera may exist on a user's computer and also in an online photo service. Also, in networked environments, it may be beneficial to have a set of information stored on a networked or shared memory and also on a local memory, such that a user may be able to access the information either while logged onto the network or operating offline and possibly remote from the networked environment. One of the functionalities or utilities that relates to such multiple data instances is synchronization. Synchronization is the process of making the data on one of the devices or networked locations equal to or synchronized with the data on the other device or network location. If new data has been added to one of the devices or to a file in one of the network files, it will be added to the corresponding file or files in the other device or network location as well when a communication link is established between the two devices or the device and the network.

In order to locate the new information, the data management system compares each tree structure and each file in the tree structure to detect what, if anything, has changed. When the new or changed data is located, it is copied over from the originating source. Because of this synchronization process, it is standard for the data management system to create and maintain the same hierarchical data structure between the two locations. This process, however, may run into problems when data in a synchronized structure is moved in one of the synchronized locations. If data has already been synchronized and then moved from its original location, then, when the synchronizing process begins, either the corresponding data will be deleted or the data management system will force the entire restructuring of the corresponding hierarchical structure to match the newly changed structure.

BRIEF SUMMARY

The various embodiments disclosed herein relate to systems, methods, and computer program products that provide synchronization between multiple data repositories. The system retrieves tree structures that represent the hierarchical organization of the data repositories that will be or are synchronized. One of tree structures is parsed for data nodes, while the other tree structures are parsed for each of those data nodes in order to find matching data nodes having corresponding hierarchies. Moved nodes in one of the tree structures are identified when a matching node is found that does not have the same hierarchy in its tree structure. Similarly, deleted nodes are identified when anode is found with no match in a controlling tree structure. Data structure lists are compiled noting matching relationships and hierarchies and also noting moved and deleted nodes and their relationships with the rest of the formerly corresponding nodes. Using these data structure lists, a synchronization interface is generated for display to a user that visually compares the synchronization of the multiple data repositories.

Additional representative embodiments are directed to methods that include retrieving two or more tree structures, wherein the two or more tree structures represent a hierarchical organization of two or more synchronized data repositories, and traversing a controlling one of the two or more tree structures to identify each data node of the controlling one. For each of these controlling data nodes, the remaining ones of the two or more tree structures are searched for a corresponding data node having a corresponding hierarchy in the remaining tree structures. Responsive to finding the corresponding data node having a corresponding hierarchy, the controlling data node, the corresponding data node, and the corresponding hierarchy are written to a merged tree data structure. A synchronization interface is then displayed on a visual display, in which the synchronization interface is generated from the merged tree data structure and visually compares the two or more tree structures.

Further representative embodiments are directed to synchronization systems that are made up from a processor, memory operable with the processor, a visual display operable with the processor, and a synchronization application stored on the memory and executable by the processor. The synchronization application includes a data interface component configured to communicate with two or more data repositories, a mapping component configured to traverse two or more tree structures representing the two or more data repositories, wherein the mapping component traverses a plurality of data nodes of the two or more tree structures to find matching ones of the plurality of data nodes across the two or more tree structures having corresponding hierarchies, and a synchronization interface component configured to generate a synchronization interface for display on the visual display, wherein the synchronization interface provides a visual comparison of the plurality of nodes of the two or more tree structures in which matching nodes with corresponding hierarchies are displayed to correspond together and ones of the nodes that do not match are displayed to correspond with node placeholder representations.

Still further representative embodiments are directed to computer program products having a computer readable mediums with computer program logic recorded thereon. The computer program products include code for retrieving two or more tree structures, wherein the two or more tree structures represent a hierarchical organization of two or more synchronized data repositories, code for traversing a controlling one of the two or more tree structures to identify each data node of the controlling tree structure, code, executable for each controlling data node, for searching remaining ones of the tree structures for a corresponding data node having a corresponding hierarchy in its tree structure, code, executable in response to finding a corresponding data node having a corresponding hierarchy, for writing the controlling data node, the corresponding data node, and the corresponding hierarchy to a merged tree data structure, and code for displaying on a visual display a synchronization interface generated from the merged tree data structure, wherein the synchronization interface visually compares the two or more tree structures.

The foregoing has outlined rather broadly the features and technical advantages of the disclosed embodiments in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the disclosed embodiments. It should also be realized by those skilled in the art that such equivalent constructions do not depart from the spirit and scope of the disclosed embodiments as set forth in the appended claims. The novel features which are believed to be characteristic of the disclosed embodiments, both as to its organization and method of operation, together with further objects and advantages will be better understood from the following description when considered in connection with the accompanying figures. It is to be expressly understood, however, that each of the figures is provided for the purpose of illustration and description only.

BRIEF DESCRIPTION OF THE DRAWINGS

For a more complete understanding of the present disclosure, reference is now made to the following descriptions taken in conjunction with the accompanying drawing, in which:

FIG. 3 is a diagram illustrating a synchronization (sync) interface configured according to one embodiment of the present disclosure;

FIG. 5A is a diagram illustrating a sync interface configured according to one embodiment of the present disclosure;

FIG. 5B is a diagram illustrating a sync interface of a sync system configured according to one embodiment of the present disclosure;

FIG. 6 is a diagram illustrating a sync interface of a sync system configured according to one embodiment of the present disclosure;

DETAILED DESCRIPTION

Figure 2:
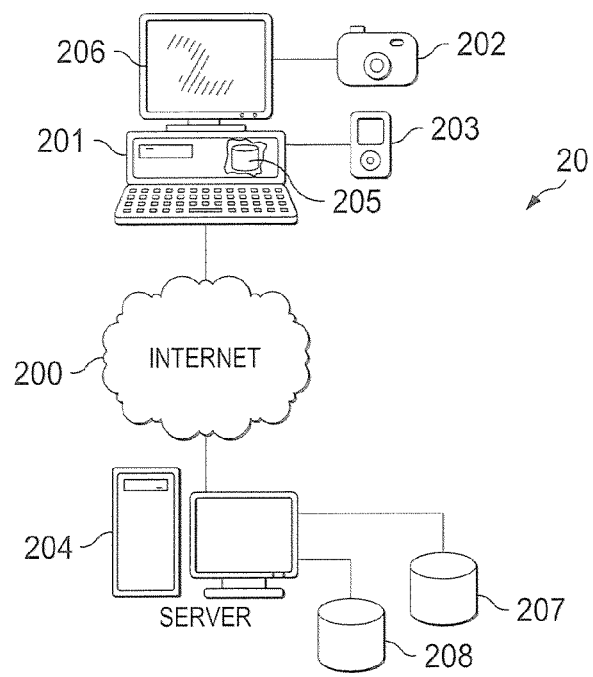
FIG. 2 is a block diagram illustrating an electronic network configured according to one embodiment of the present disclosure.

In providing a synchronization system for synchronizing multiple hierarchical data structures various relationships between hardware and networks are possible. FIG. 2 is a block diagram illustrating electronic network 20 configured according to one embodiment of the present disclosure. Internet 200 provides connections between various computer entities, such as personal computer 201 and server 204. Synchronization of hierarchical data structures may occur between the data stored on local memory 205 and a second instance of that data on remote memories 207-208 accessible by server 204. Additional synchronization can occur with data structures stored and/or created on camera 202 or digital music player 203 and either personal computer 201, server 204, or both. The synchronization scheme and management functionality may be presented through a synchronization interface (not shown) displayed to a user on computer display 206 of personal computer 201. By interacting with the interface on computer display 206, the user can assist in managing synchronization of various hierarchical data structures.

In a first example operation, photographs stored on local memory 205 of personal computer 201 are to be synchronized with an online photography service operated and provided to users by server 204 along with remote memories 207-208. FIG. 3 is a diagram illustrating synchronization (sync) interface 30 of a sync system configured according to one embodiment of the present disclosure. Sync interface 30 displays (e.g., on computer display 206 of personal computer 20—FIG. 2) an interface comparing the two hierarchical data structures of the data systems being synchronized. Desktop structure 300 represents the hierarchical data structure of photographs found on a users desktop computer (i.e., personal computer 201—FIG. 2). Online structure 301 represents the hierarchical data structure of the associated online network (e.g., provided on server 204—FIG. 2) which the user accesses for various photographic features and functionalities. Sync selection area 302 provides user-selectable interface objects, such as sync boxes 312-314, that allow the user to select which folders to synchronize between desktop structure 300 and online structure 301.

Figure 1:
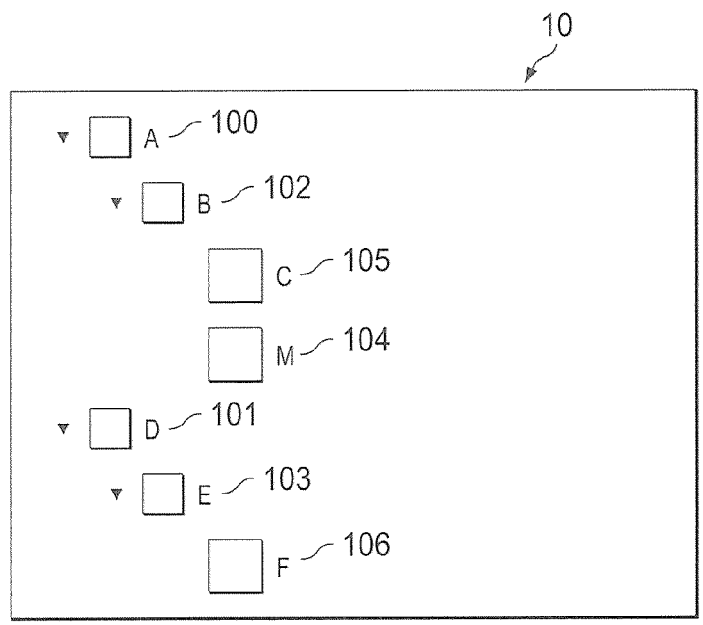
FIG. 1 is a diagram illustrating hierarchical data structure.

Desktop structure 300 reflects hierarchical data structure 10, as presented in FIG. 1. The structure presents folders A-100 and B-102 within A-100 and picture files M-104 and C-105 organized in folder B-102. The structure also includes folders D-101 and E-103 within D-101 and picture file F-106 organized in folder E-103. For purposes of example only, folder A-100 may represent pictures from the user's Summer vacation of 2008, while folder B-102 are the pictures from a baseball game attended during the Summer of 2008. Thus, picture files M-104 and C-105 may be two of the pictures from this baseball game. Similarly, folder D-101 may represent pictures from the user's trip to visit his or her family over New Year's of 2008, while folder E-103 is a further organization of those New Year's photos at a New Year's Eve party, of which picture file F-106 is one. These specific organizational characteristics are provided purely as an example and are not intended to limit the scope of the present disclosure in any way.

When the connection between the user's computer (i.e., personal computer 201—FIG. 2) and the online service (i.e., server 204—FIG. 2) is first established, the synchronization system that generates sync interface 30 begins by comparing the hierarchical data structures at each location. The folders and files within desktop structure 300 accurately reflect the data and hierarchical file system located on personal computer 201—FIG. 2. The sync system then checks against the hierarchical data structure on server 204—FIG. 2. For purposes of this example, the Summer vacation pictures have been stored since the last synchronization with the online photo application. Thus, folders A-100, B-102, and photo files M-104 and C-105 do not have corresponding files located on server 204—FIG. 2. Therefore, in sync interface 30, grayed-out representations are added to represent to the user that folders A-100, B-102, and photo files M-104 and C-105 are not currently located within online structure 301. As the system traverses the desktop structure 300 and does not find corresponding nodes in online structure 301, these nodes are added to a merged tree data structure within the sync system. The New Year's trip photos have already been synchronized, and are, therefore, already within online structure 301, as represented by corresponding folders D-303 and E-304 and photo file F-305. Because the sync system finds the corresponding folders in both desktop structure 300 and online structure 301, those corresponding nodes are also added to the merged tree data structure in the sync system. In order to compile the visual representation of online structure 301 on sync interface 30, the sync system uses the merged tree data structure.

Sync interface 30 also provides sync boxes 312-314 which allow the user to designate any of the leaf node files, i.e., photo files 104-106, for synchronization with the online photo application. By checking sync boxes 312 and/or 313, the sync system will synchronize the files and the file structure between desktop structure 300 and online structure 301.

It should be noted that sync indicators may be represented as any type of interactive interface object. While such sync indicators have been represented as check boxes for sync boxes 312-314, additional and/or alternative embodiments of the present disclosure may be implemented using various other interface objects, such as radio buttons, toggle switches, sliders, and the like.

Figure 4A:
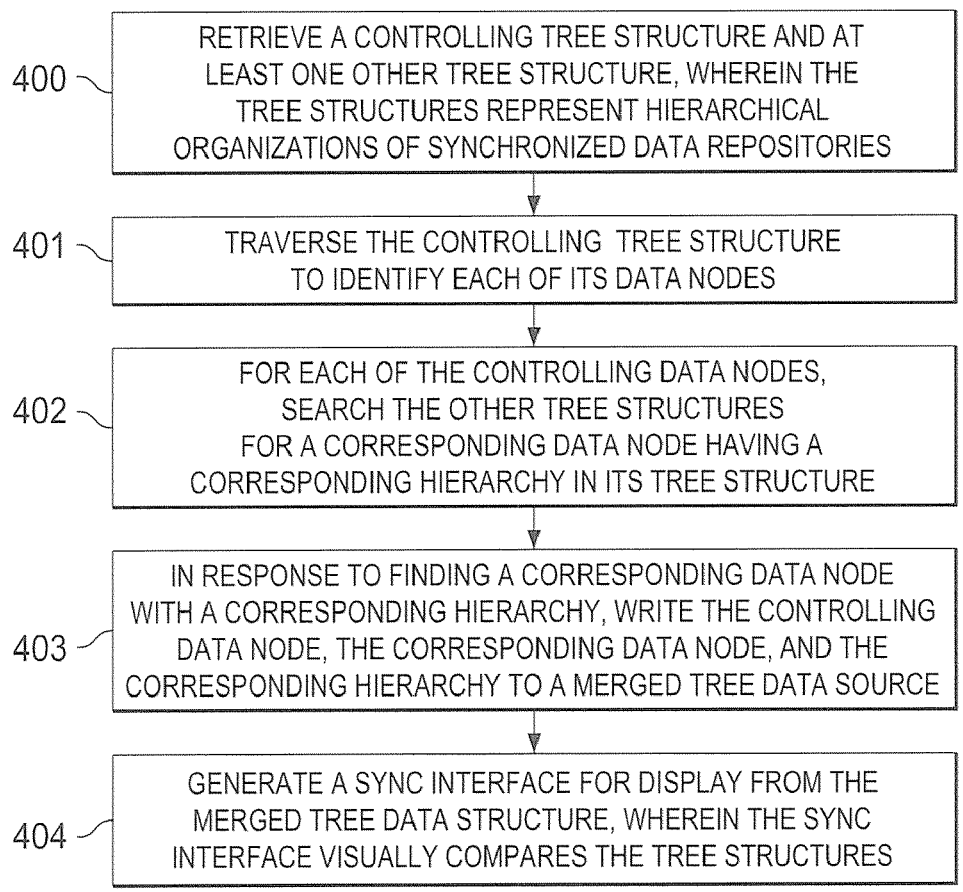
FIG. 4A is a flowchart illustrating example steps executed to implement one embodiment of the present disclosure.

FIG. 4A is a flowchart illustrating example steps executed to implement one embodiment of the present disclosure. In step 400, the tree structures of the stored data are retrieved from the storage locations subject to the sync system. The tree structure of the controlling data instance is traversed, in step 401, for each of its data nodes. For each of the controlling data nodes, the remaining tree structures are searched, in step 402, for a corresponding data node having a corresponding hierarchy in its tree structure. In response to finding a corresponding data node with a corresponding hierarchy, the controlling data node, the corresponding data node, and the corresponding hierarchy are written to a merged tree data structure, in step 403. In step 404, a sync interface generated from the merged tree data structure is displayed on a visual display, wherein the sync interface visually compares two or more tree structures.

Figure 4B:
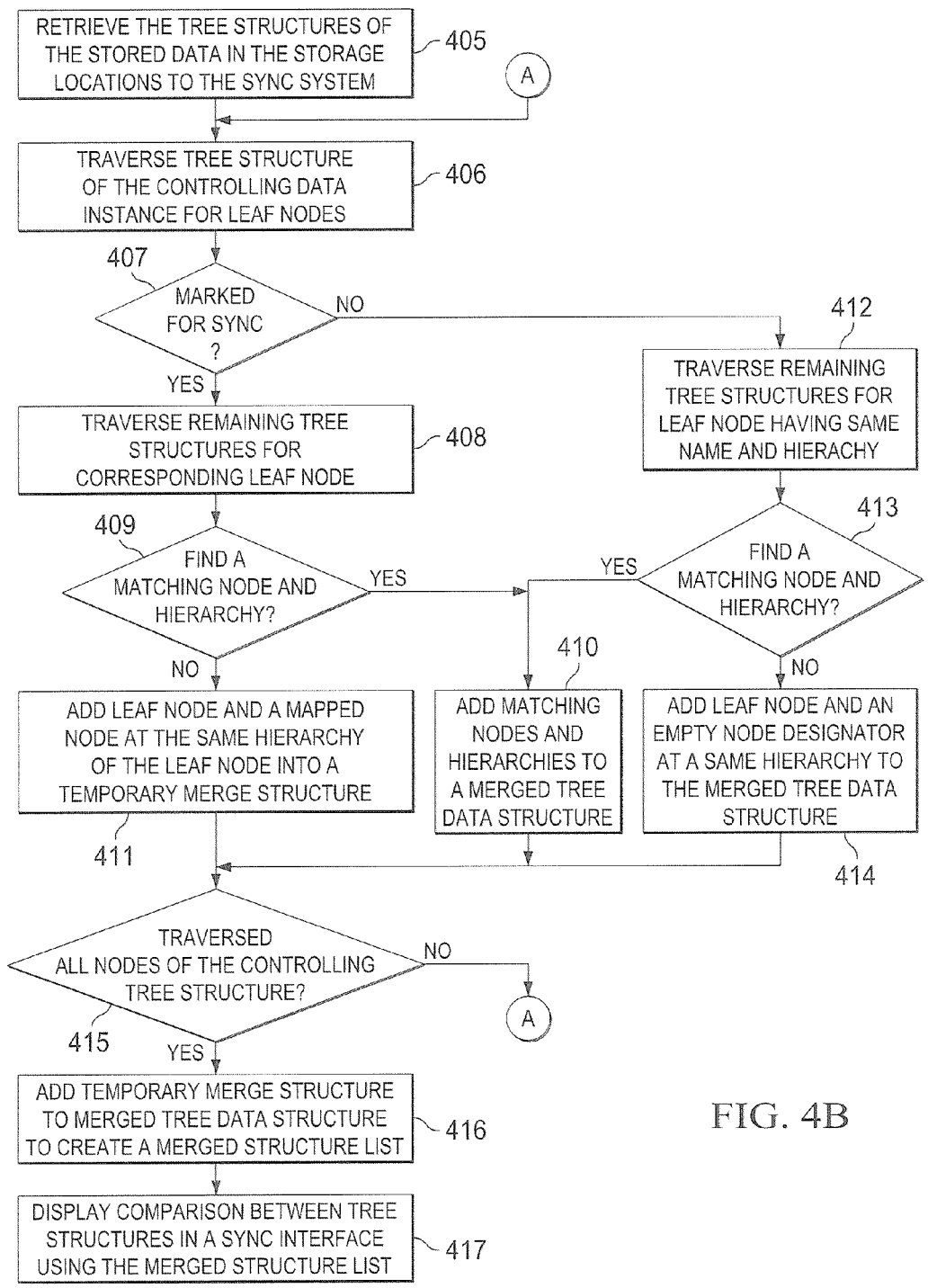
FIG. 4B is a flowchart illustrating example steps executed to implement another embodiment of the present disclosure.

It should be noted that additional and/or alternative embodiments of the present disclosure may employ various different steps in their respective implementations. For example, FIG. 4B is a flowchart illustrating example steps executed to implement another embodiment of the present disclosure. In step 405, the tree structures of the stored data are retrieved from the storage locations subject to the sync system. The tree structure of the controlling data instance is traversed, in step 406, for the first leaf node. The first leaf node is checked, in step 407, to determine if it has been marked for synchronization. If so, each of the remaining tree structures is traversed, in step 408, to determine if a corresponding leaf node to the first leaf node is found in the same file hierarchy. A determination is made, in step 409, whether such a matching node has been found. If a corresponding leaf node and hierarchy is found, the first leaf node and the corresponding node are added to a merged tree data structure, in step 410, along with any required file hierarchies. The merged tree data structure represents a tree structure comparison of the controlling tree structure against the synchronized tree structures where the synchronized tree structure actually contains the corresponding file node. If no corresponding node and hierarchy is found, then, in step 411, the first leaf node and a mapped node at the same level as the first leaf node into a temporary merge structure. The temporary merge structure represents a tree structure comparison of the controlling tree structure against the synchronized tree structures where the synchronized tree structures do not have the corresponding file nodes.

If, in response to step 407, it is determined that the first leaf node is not marked for synchronization, each of the remaining tree structures is traversed, in step 412, searching for a file node having the same name and hierarchical level as the first leaf node. A determination is made, in step 413, whether a matching name and hierarchy is found. If such a file node is found, the first leaf node and corresponding file node are added to the merged tree data structure in step 405. Otherwise, the first leaf node is added to the merged tree data structure, in step 414, along with an empty node designator which would represent the first leaf node in the other remaining tree structure representations. A determination is made, in step 415, whether each node of the controlling tree structure has been traversed. If not, then the process is repeated again from step 406. Once each node has been traversed in the controlling tree structure, the temporary merge structure is added to the merged tree structure, in step 416, to create a merged structure list. In step 417, the sync system uses the merged structure list to display a sync interface which shows a comparison between the controlling tree structure and the remaining tree structures.

Referring now to FIG. 5A, a diagram of sync interface 30 of a sync system is illustrated configured according to one embodiment of the present disclosure. In response to the file hierarchy comparison illustrated in FIG. 3, the user provides sync check 501 to indicate a desire to synchronize photo file M-104 of desktop structure 300 with online structure 301. In response to the user indicating for the sync system to synchronize photo file M-104, sync interface 30 is changed to reflect synchronize photo file M-500 in online structure 301. The change to sync interface 30 indicates to the user that a synchronization is going to take place between the designed file structures.

FIG. 5B is a diagram illustrating sync interface 30 of a sync system configured according to one embodiment of the present disclosure. Once the user provides sync check 501 and activates the sync mechanism, synchronized photo file M-500 is copied onto the file structure of the online application along with its file hierarchy. When presenting this synchronization to the user, sync interface 30 adds icons representing synchronized photo file M-500 along with folders A-502 and B-503 in the same file hierarchy. Therefore, the user is informed that online structure 301 now includes a synchronized copy of photo file M-105, represented as synchronized photo file M-500. Unsynchronized photo file C-309 remains in its unsynchronized state to visually indicate to the user that it does not yet exist within online structure 301. Sync check 501 also remains to visually indicate that a synchronized relationship will exist between M-105 and M-500 for each time the synchronization occurs between the data structures. For example, the user may decide to edit or modify the photograph of M-105 in a photo editing application on the local computer (i.e., personal computer 201—FIG. 2). When the user re-connects or re-synchronizes with the online photo application, the updated file of M-105 will be synchronized with M-500 to reflect those changes and sync interface 30 will be updated once the synchronization cycle is complete.

It should be noted that in additional and/or alternative embodiments of the present disclosure, synchronization may occur automatically as soon as the user selects a synch selection interface, such as sync check 501.

In some situations, it may be desired by the user to move a file within the file structure of the local computer. FIG. 6 is a diagram illustrating sync interface 60 of a sync system configured according to one embodiment of the present disclosure. For purposes of the description of FIG. 6, sync interface 60 provides a comparison between the hierarchical file structure of a digital music device and a desktop music repository. Each of the synchronizable file nodes, therefore, would be music files of some sort.

Before connecting the user's computer (not shown, but, for example, personal computer 201-FIG. 2) with the user's digital music device (not shown, but, for example, digital music player 203-FIG. 2), the user moved music file D>E>C-604 from a first playlist, i.e., folder B-102 of folder A-100, to a second playlist, i.e., folder E of folder D-101. When the user connects the computer and the music device, merged structure list 609 is created by traversing the tree structures for the music data on the user's computer and the music data on the user's music device. Merged structure list 609 is used by a sync system to create sync interface 60. Sync interface 60 uses merged structure list 609 to present desktop structure 600 including the hierarchical data structure of the music stored on the user's computer compared against device structure 601 including the hierarchical data structure of the music stored on the user's music device and also presents sync selection area 602 for any sync boxes that the user may check to designate certain files for synchronization.

As the sync system traverses the tree structures of the data instances, music file D>E>C-604 is found in desktop structure 600 marked for synchronization, evidenced to the user through sync check 607. However, when traversing the tree structure of the music device, the sync system finds a synchronized file C-605, but it does not have the same file hierarchy as on the user's computer. The sync system writes an empty or null node with the original hierarchy of C-603 and the existing synchronized file C-605 with its hierarchy in temporary merge list 608, instead of merged structure list 609. This discovery of the same file node in both hierarchies, but at different hierarchical locations indicates to the sync system that music file D>E>C-604 has been moved in the user's computer. Because moved music file D>E>C-604 cannot be shown on desktop structure 600 as being both a child of folder B-102 of folder A-100 and a child of folder E of folder D-101, temporary merge list 608 is used, as noted above.

In FIG. 6, temporary merge list 608 is shown to contain C-603 and C-605, while merged structure list 609 is shown to contain the remaining nodes of the tree structures. As the sync system generates sync interface 60, it combines both merged structure list 609 and temporary merge list 608 into a main merged structure list to generate the visual representation. The empty/null node is displayed in the original location of C-603 while the moved copy of C-604 is placed at the bottom of sync interface using a single-line address showing its hierarchical position, i.e., music file D>E>C-604. The original location, C-603 is obtained from the synchronized file C-605 in device structure 601. Sync interface 60 also removes the sync box relating the originally located C-603 to C-605, because the original C-603 is no longer located in a position that would support synchronization with C-605. Instead, a corresponding file entry A>B>C-606 is provided in device structure 601 associated with the moved version of music file D>E>C-604 but which still defines the current organizational location of the corresponding synchronized file node.

Sync check 607, which is indicated to designate D>E>C-604 for synchronization, is provided in sync selection area 602 in order to reflect the new position within desktop structure 600. When the user activates synchronization, C-605 will be deleted from its previous represented location in sync interface 60 for device structure 601 and moved to A>B>C-606, where it will be renamed within sync interface 60 as D>E>C-606. However, because music file C-605 already exists on device structure 601, the user may also select not to synchronize the moved file, D>E>C-604. In such an instance, C-605 will remain a child of folders A-502 and B-503, unlike the new hierarchy of desktop structure 600, but the user will be able to maintain the contents of both locations without forcing the other location to take on the new hierarchy of the modified location. Moreover, in the visual representation provided by sync interface 60, the user is apprised of both the original and new locations of the moved files.

Figure 7:
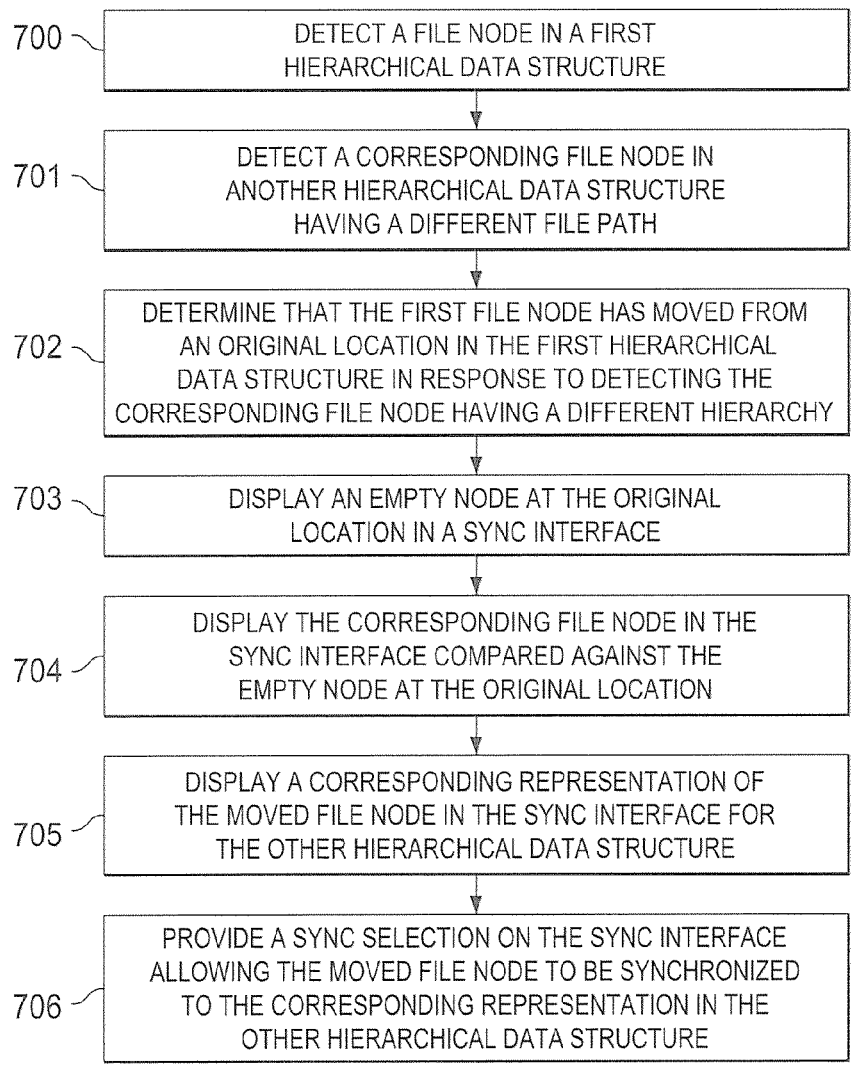
FIG. 7 is a flowchart illustrating example steps executed to implement one embodiment of the present disclosure.

FIG. 7 is a flowchart illustrating example steps executed to implement one embodiment of the present disclosure. In step 700, a first file node is detected in a first hierarchical data structure. A corresponding file node is detected, in step 701, in another hierarchical data structure having a different file path. In response to detecting the corresponding file node having a different file path, determine, in step 702, that the first file node has moved from an original location in the first hierarchical data structure. Display in a sync interface, in step 703, an empty node representing the moved file at the original location. Display in the sync interface, in step 704, the corresponding file node compared against the empty node at the original location. Display in the sync interface, in step 705, a corresponding representation of the moved first file node in the other hierarchical data structure being compared against the first hierarchical data structure. Provide a synchronization selection, in step 706, on the sync interface allowing the moved first file node to be synchronized to the corresponding representation in the other hierarchical data structure.

Figures 8, 10:
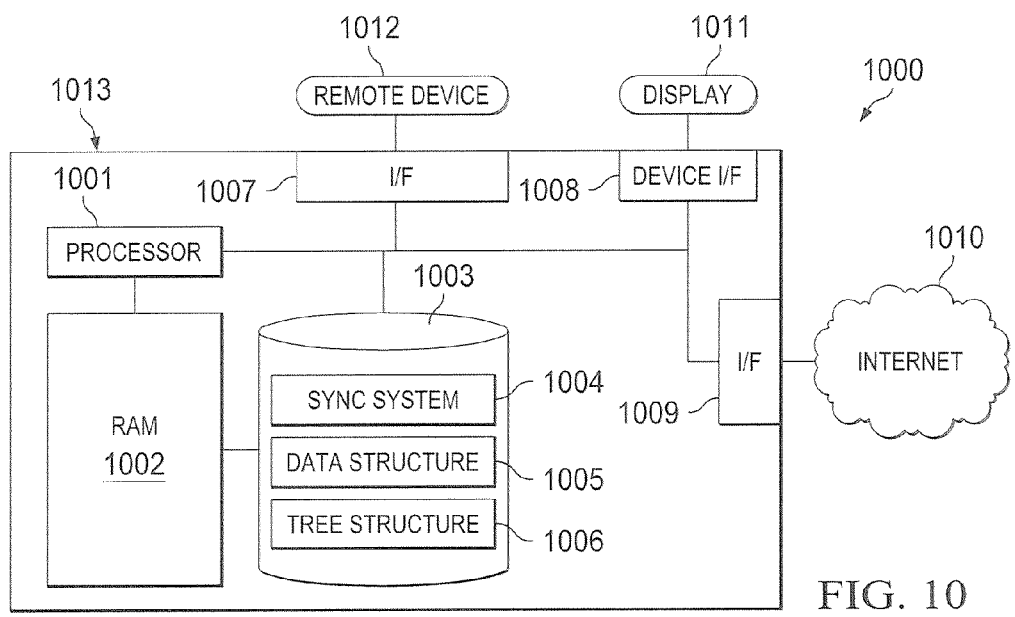
FIG. 8 is a diagram illustrating sync interface 80 of a sync system configured according to one embodiment of the present disclosure.
FIG. 10 is a block diagram illustrating an electronic sync system configured according to one embodiment of the present disclosure.

An additional scenario that may arise in managing multiple sets of hierarchical data is when a file is deleted from one of the controlling data sets. FIG. 8 is a diagram illustrating sync interface 80 of a sync system configured according to one embodiment of the present disclosure. For purposes of the example embodiment depicted in FIG. 8, the sync system provides synchronization between a networked file system and a local file system on a user's computer. When the user disconnects from the network, he or she is able to edit documents within the hierarchical file system. When the user reconnects to the network, the sync system synchronizes the documents found on the user's local machine with the documents on the networked file system, which is also a hierarchical data structure. In example operation, the local file system includes the same hierarchical data structure illustrated in FIG. 1. The user deletes file C-104 from the local machine.

When the user reconnects to the network, the sync system generates a merged structure list by traversing through the tree structures of both the local machine and the networked file system. The merged structure list is then used to create sync interface 80 visually presenting a comparison of desktop structure 800 and network structure 801. Folders A-100, B-102, and file 105, and folders D-101, E-103, and file F-106 are displayed as a part of desktop structure 800 while corresponding folders A-803, B-804, and file M-805, and folders D-807, E-808, and file F-809 are displayed as a part of networked structure 801. As the sync system traverses through the tree structure of the networked file structure, it finds file C-806 within the file structure of folder B-804 and folder A-803. However, it did not find a matching instance of file C on the local machine. Because the networked file system is synchronized with the local machine, the failure to find file C on the local machine while discovering file C-806 on the networked system means that file C has been deleted from the local machine. Once the deletion is determined, empty node 104 is displayed on sync interface 80 within desktop structure 800 to indicate that file C has been deleted from the local machine. Sync boxes 810-812 are still provided for the user to designate the files that he or she wishes to set up for synchronization.

It should be noted that in selected embodiments of the present disclosure, activating a synchronization would cause C-806 to be deleted, while in other embodiments, synchronization would cause file node C to be re-installed onto the local data structure. Still other embodiments may provide a selection by the user to determine the results of synchronization.

Figure 9:
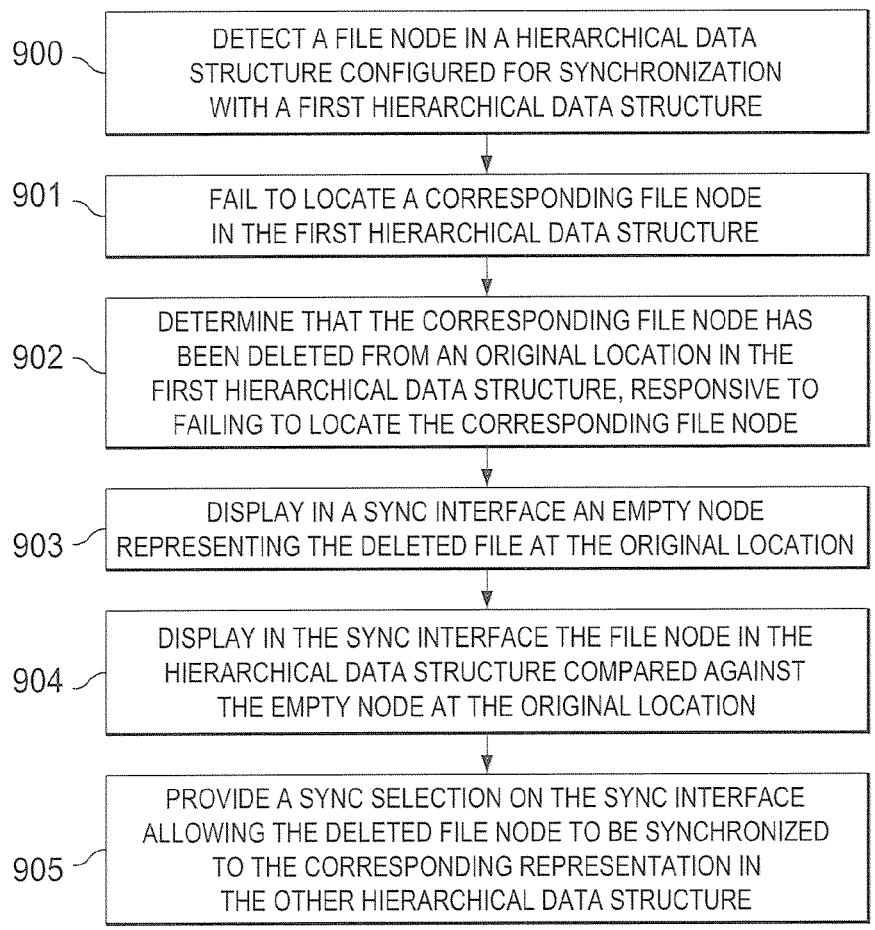
FIG. 9 is a flowchart illustrating example steps executed to implement one embodiment of the present disclosure.

FIG. 9 is a flowchart illustrating example steps executed to implement one embodiment of the present disclosure. In step 900, a file node is detected in a hierarchical data structure configured for synchronization with a first hierarchical data structure. In step 901, a corresponding file is not located in the first hierarchical data structure. In response to failing to locate a corresponding file in the first hierarchical data structure, determine, in step 902, that the corresponding file node has been deleted from an original location in the first hierarchical data structure. Display in a sync interface, in step 903, an empty node representing the deleted file at the original location. Display in the sync interface, in step 904, the file node in the hierarchical data structure compared against the empty node at the original location. Provide a synchronization selection, in step 905, on the sync interface allowing the moved first file node to be synchronized to the corresponding representation in the other hierarchical data structure.

FIG. 10 is a block diagram illustrating electronic sync system 1000 configured according to one embodiment of the present disclosure. Electronic sync system 1000 includes local machine 1013, comprising processor 1001, RAM 102, local memory 1003 and interfaces 1007 that are used to connect local machine 1013 to remote device 1012. An interface, interface 1009, also exists for connecting local machine 1013 to Internet 1010. Finally, display interface 1008 provides an interface with display 1011. Sync system 1004 is a software application stored in local memory 1003 along with data structure 1005 and tree structure 1006. Sync system 1004 is loaded as necessary into RAM 1002 for processing by processor 1001 to operate the sync system. Data structure 1005 is the actual data structure where the information is stored. Tree structure 1006 is the tree model representation of the actual data structure being managed. The logic found in sync system 1004 controls the parsing of the tree structures and the presentation of the sync interface according to the rules described herein. Once the tree structure has been traversed, the generated lists are also stored in local memory 1003.

The program or code segments making up the various embodiments of the present disclosure may be stored in a computer readable medium or transmitted by a computer data signal embodied in a carrier wave, or a signal modulated by a carrier, over a transmission medium. The "computer readable medium" may include any physical, tangible medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 11:
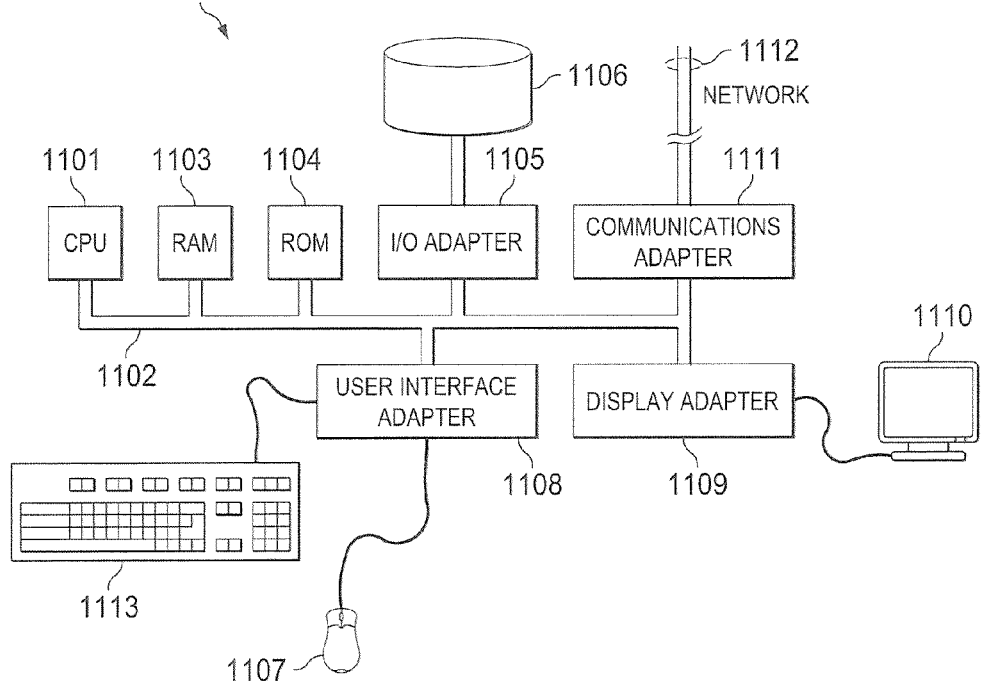
FIG. 11 is a block diagram illustrating a computer system configured to operate a synchronization system according to the teachings of one embodiment of the present disclosure.

FIG. 11 illustrates computer system 1100 adapted to use embodiments of the present disclosure, e.g. storing and/or executing software associated with the embodiments. Central processing unit (CPU) 1101 is coupled to system bus 1102. The CPU 1101 may be any general purpose CPU. However, embodiments of the present disclosure are not restricted by the architecture of CPU 1101 as long as CPU 1101 supports the inventive operations as described herein. Bus 1102 is coupled to random access memory (RAM) 1103, which may be SRAM, DRAM, or SDRAM. ROM 1104 is also coupled to bus 1102, which may be PROM, EPROM, or EEPROM. RAM 1103 and ROM 1104 hold user and system data and programs as is well known in the art.

Bus 1102 is also coupled to input/output (I/O) controller card 1105, communications adapter card 1111, user interface card 1108, and display card 1109. The I/O adapter card 1105 connects storage devices 1106, such as one or more of a hard drive, a CD drive, a floppy disk drive, a tape drive, to computer system 1100. The I/O adapter 1105 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 1111 is adapted to couple the computer system 1100 to a network 1112, which may be one or more of a telephone network, a local (LAN) and/or a wide-area (WAN) network, an Ethernet network, and/or the Internet network. User interface card 1108 couples user input devices, such as keyboard 1113, pointing device 1107, and the like, to the computer system 1100. The display card 1109 is driven by CPU 1101 to control the display on display device 1110.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the various disclosed embodiments, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   retrieving a controlling tree structure and at least one other tree structure, wherein said controlling tree structure and said at least one other tree structure represent hierarchical organizations of synchronized data repositories;
   traversing said controlling tree structure to identify each data node of said controlling tree structure;
   for said each data node, searching said at least one other tree structure for a corresponding data node having a corresponding hierarchy in said at least one other tree structure;
   responsive to finding said corresponding data node with said corresponding hierarchy, writing said each data node, said corresponding data node, and said corresponding hierarchy to a merged tree data structure;
   responsive to finding said corresponding data node without said corresponding hierarchy, writing said corresponding data node and an unmatched hierarchy of said corresponding data node to a temporary tree data structure; and
   generating a synchronization interface for display by combining said merged tree data structure and said temporary tree data structure, wherein said synchronization interface visually compares said controlling tree structure and said at least one other tree structure.

2. The method of claim 1 further comprising:
   traversing the at least one other tree structure for an unmatched data node, wherein said unmatched data node does not correspond to any of said each data nodes of said controlling tree structure;
   responsive to said unmatched data node being marked for synchronization, determining that a corresponding controlling data node of said controlling tree structure has been deleted; and
   displaying in said synchronization interface a deleted node indicator in a presentation block representing said controlling tree structure, wherein said deleted node indicator corresponds to said unmatched data node.

3. The method of claim 2 further comprising:
   responsive to said determining, writing said unmatched data node, said deleted node indicator, and said corresponding hierarchy to said merged tree data structure.

4. The method of claim 2 further comprising:
   providing a synchronization selector on said synchronization interface in association with said deleted node indicator and said unmatched data node, wherein, in response to a user selecting said synchronization selector, said deleted node indicator and said unmatched data node are synchronized.

5. The method of claim 4 wherein said synchronization of said deleted node indicator and said unmatched data node comprises one of:
   deleting said unmatched data node in said remaining ones; or
   re-installing a data file corresponding to said unmatched data node into said controlling tree structure at said corresponding hierarchy.

6. The method of claim 1 further comprising:
   responsive to finding said corresponding data node with said unmatched hierarchy, displaying a moved node indicator on said synchronization interface in a presentation block representing said controlling tree structure, wherein said moved node indicator is positioned on said presentation block at a level corresponding to said unmatched hierarchy; and
   displaying a new moved node indicator on said synchronization interface in a presentation area representing said at least one other tree structure, wherein said new moved node indicator is positioned on said presentation area corresponding to said each data node with a moved hierarchy.

7. The method of claim 6 further comprising:
   removing a rendered synchronization selector from said synchronization interface between said moved node indicator and said corresponding data node; and
   displaying a new synchronization selector on said synchronization interface between said each data node and said new moved node indicator, wherein upon selection of said new synchronization selector by a user, said controlling tree structure and said at least one other tree structure at synchronized.

8. The method of claim 7 wherein said synchronization of said two or more synchronized repositories comprises:
   moving said corresponding data node from said moved hierarchy to said corresponding hierarchy in said remaining ones.

9. A synchronization system comprising:
   a processor;
   memory configured to operate with said processor;
   a visual display configured to operate with said processor; and
   a synchronization application stored on said memory and executable by said processor, wherein said synchronization application comprises:
      a data interface component configured to communicate with two or more data repositories;
      a mapping component configured to traverse two or more tree structures representing said two or more data repositories, wherein said mapping component traverses a plurality of data nodes of said two or more tree structures;
      responsive to finding matching ones of said plurality of data nodes across said two or more tree structures, writing said matching ones to a merged tree data structure;
      responsive to finding unmatching ones of said plurality of data nodes across said two or more tree structures, writing said unmatching ones to a temporary tree data structure; and a synchronization interface component configured to generate a synchronization interface for display on said visual display based at least in part on said merged tree data structure and said temporary tree data structure, wherein said synchronization interface provides a visual comparison of said plurality of nodes of said two or more tree structures.

10. The synchronization system of claim 9:
wherein said mapping component is further configured to identify which of said plurality of nodes are marked for synchronization; and
wherein said synchronization interface component is further configured to use a temporary node placeholder representation for ones of said plurality of nodes marked for synchronization and to use an empty node placeholder representation for others of said plurality of nodes not marked for synchronization.

11. The synchronization system of claim 9:
wherein said synchronization interface component is further configured to display a moved node indicator on said synchronization interface at a location corresponding to said unmatched hierarchy of said matching node on one of said two or more tree structures; and
wherein said synchronization interface component is further configured to display a temporary node indicator at a location on said synchronization interface at said unmatched hierarchy corresponding to another of said two or more tree structures, such that display of said unmatched hierarchies is preserved.

12. The synchronization system of claim 9:
wherein said mapping component is further configured to identify deleted ones of said plurality of nodes on a controlling one of said two or more tree structures by finding an unmatched node on non-controlling ones of said two or more tree structures that is marked for synchronization; and
wherein said synchronization interface component is further configured to display a deleted node indicator in a visual representation of a controlling one of said two or more tree structures on said synchronization interface at a corresponding hierarchy to said unmatched node.

13. The synchronization system of claim 9 wherein said synchronization component further comprises:
a user interface component operable in conjunction with said synchronization interface component, wherein said user interface component directs said synchronization interface component to display user selectable objects in relation to ones of said plurality of nodes, wherein said user selectable objects allow a user to select which of said plurality of nodes to mark for synchronization.

14. A non-transitory computer readable medium comprising program code, the program comprising:
program code for retrieving a controlling tree structure and at least one other tree structure, wherein said controlling tree structure and said at least one other tree structure represent hierarchical organizations of synchronized data repositories;
program code for traversing said controlling tree structure to identify each data node of said controlling tree structure;
program code, executable for said each data node, for searching said at least one other tree structure for a corresponding data node having a corresponding hierarchy in said at least one other tree structure;
program code, executable responsive to finding said corresponding data node with said corresponding hierarchy, for writing said each data node, said corresponding data node, and said corresponding hierarchy to a merged tree data structure;
program code, executable responsive to finding said corresponding data node without said corresponding hierarchy, for writing said corresponding data node and an unmatched hierarchy of said corresponding data node to a temporary tree data structure; and
program code for generating a synchronization interface for display by combining said merged tree data structure and said temporary tree data structure, wherein said synchronization interface visually compares said controlling tree structure and said at least one other tree structure.

15. The non-transitory computer readable medium of claim 14 further comprising:
program code for traversing said remaining ones for an unmatched data node, wherein said unmatched data node does not correspond to any of said each data nodes of said controlling one;
program code, executable responsive to said unmatched data node being marked for synchronization, for determining that a corresponding controlling data node of said controlling one has been deleted; and
program code for displaying in said synchronization interface a deleted node indicator in a presentation block representing said controlling one, wherein said deleted node indicator corresponds to said unmatched data node.

16. The non-transitory computer readable medium of claim 15 further comprising:
program code, executable responsive to said determining, for writing said unmatched data node, said deleted node indicator, and said corresponding hierarchy to said merged tree data structure.

17. The non-transitory computer readable medium of claim 15 further comprising:
program code for providing a synchronization selector on said synchronization interface in association with said deleted node indicator and said unmatched data node, wherein, in response to a user selecting said synchronization selector, said deleted node indicator and said unmatched data node are synchronized.

18. The non-transitory computer readable medium of claim 17 wherein said synchronization of said deleted node indicator and said unmatched data node comprises one of:
program code for deleting said unmatched data node in said remaining ones; or
program code for re-installing a data file corresponding to said unmatched data node into said controlling one at said corresponding hierarchy.

19. The non-transitory computer readable medium of claim 14 further comprising:
program code, executable responsive to finding said corresponding data node with said unmatched hierarchy, for displaying a moved node indicator on said synchronization interface in a presentation block representing said controlling one, wherein said moved node indicator is positioned on said presentation block at a level corresponding to said unmatched hierarchy; and
program code for displaying a new moved node indicator on said synchronization interface in a presentation area representing said at least one other tree structure, wherein said new moved node indicator is positioned on said presentation area corresponding to said each data node with a moved hierarchy.

20. The non-transitory computer readable medium of claim 19 further comprising:
- program code for removing a rendered synchronization selector from said synchronization interface between said moved node indicator and said corresponding data node; and
- program code for displaying a new synchronization selector on said synchronization interface between said each data node and said new moved node indicator, wherein upon selection of said new synchronization selector by a user, said controlling tree structure and said at least on other tree structure are synchronized.

21. The non-transitory computer readable medium of claim 20 wherein said synchronization of said two or more synchronized repositories comprises:
- program code for moving said corresponding data node from said moved hierarchy to said corresponding hierarchy in said remaining ones.

* * * * *